United States Patent [19]
Humphreys et al.

[11] Patent Number: 6,151,701
[45] Date of Patent: Nov. 21, 2000

[54] METHOD FOR RECONSTRUCTING DEBUGGING INFORMATION FOR A DECOMPILED EXECUTABLE FILE

[75] Inventors: Greg Humphreys, Mountain View, Calif.; Paul J. Martino, Lansdale, Pa.

[73] Assignee: AHPAH Software, Inc., Mountian View, Calif.

[21] Appl. No.: 09/162,472

[22] Filed: Sep. 28, 1998

Related U.S. Application Data

[60] Provisional application No. 60/060,480, Sep. 30, 1997.

[51] Int. Cl.[7] .................................................. G06F 9/45
[52] U.S. Cl. ............................................................. 717/4
[58] Field of Search .................................................. 717/4

[56] References Cited

U.S. PATENT DOCUMENTS

| | | | |
|---|---|---|---|
| 5,193,180 | 3/1993 | Hastings | 395/710 |
| 5,287,548 | 2/1994 | Flood et al. | 395/375 |
| 5,559,884 | 9/1996 | Davidson et al. | 380/4 |
| 5,560,009 | 9/1996 | Lenkov et al. | 395/700 |
| 5,630,049 | 5/1997 | Cardoza et al. | 395/183.01 |
| 5,732,273 | 3/1998 | Srivastava et al. | 395/704 |
| 5,740,444 | 4/1998 | Frid-Nielsen | 395/705 |
| 5,881,288 | 3/1999 | Sumi et al. | 395/704 |
| 5,940,617 | 8/1999 | Tamura | 395/704 |
| 6,014,516 | 1/2000 | Nishiumi | 395/705 |

OTHER PUBLICATIONS

Breuer et al. Decompilation: The Enumeration of Types and Grammars. ACM. pp. 1613–1647, Sep. 1994.

Hudson et al. Debugging Lenses: A New Class of Transparent Tools for User Interface Debugging. ACM. pp. 179–187, Sep. 1997.

Aho et al. Compilers: Principles, Techniques, and Tools. Addison–Wesley Publishing Company. pp. 463–473, Mar. 1988.

*Primary Examiner*—Tariq R. Hafiz
*Assistant Examiner*—Wei Zhen
*Attorney, Agent, or Firm*—Philip H. Albert; Townsend and Townsend and Crew LLP

[57] ABSTRACT

A debugging system according to the present invention includes a decompiler that provides information to a table generator, which generates a line number map and a symbol table, each of which corresponds to an executable file being decompiled. In a specific embodiment, hooks into specific operations performed by the decompiler trigger the table generator operation. A debugging information program can be hooked into a decompiler to generate the debugging information and modify the source code output by the decompiler. For example, the program can be hooked into the decompiler to monitor when the decompiler inserts or deletes source statements, generates line numbers for source lines, or assigns variable names to variables encountered in the executable code.

10 Claims, 8 Drawing Sheets

```
1:    void f()
2:    {
3:        int a = 0;
4:        int b = a++;
5:        int c = 100;
6:
7:        c = a + b;
8:    }
```

FIG. 4

```
0:   iconst_0 // push 0 on the stack
1:   istore_0 // store the top element of the stack to
     variable 0
2:   iload_   // push variable 0 on the stack
3:   iinc 0 1 // increment variable 0 by 1
6:   istore_1 // store the top element of the stack to
     variable 1
7:   bipush 100  // push 100 on the stack
9:   istore_2 // store the top element of the stack to
     variable 2
10:  iload_0  // push variable 0 on the stack
11:  iload_1  // push variable 1 on the stack
12:  iadd// add the top two elements and push the
     result
13:  istore_2 // store the top element of the stack to
     variable 2
```

FIG. 5

```
1:    void func_1()
2:    {
3:        int int_0 = 0;
4:        int int_1 = int_0++;
5:        int int_2 = 100;
6:
7:        int_2 = int_0 + int_1;
8:    }
```

FIG. 6

| Program Counter | Source Line |
|---|---|
| 0,1 | 3 |
| 2,3,6 | 4 |
| 7,9 | 5 |
| 10,11,12,13 | 7 |

FIG. 7

| Variable # | Symbol Name |
|---|---|
| 0 | a |
| 1 | b |
| 2 | c |
| ... | ... |

FIG. 8

```
File  Edit  Search  Run  Compile  Debug  Project  Options  Window  Help
┌─SOURCE.TXT──────────────────────┐ ┌──Watch──────────1-[]
1:  void func_1()                 │ │ int_1: 2
2:  {                             │ │ int_2: 100
3:      int int_0 = 0;            │ │
4:      int int_1 = int_0++;      │ │
5:      int int_2 = 100;          │ │
--->6:     int_2 = int_0 + int_1; │ │
7:                                │ │
8:  }                             │ │
1:1                               │ │
┌─EXECUTE.TXT─────────────────────────────────────────────────────2
 0:  iconst_0     // push 0 on the stack
 1:  istore_0     // store the top element of the stack to variable 0
 2:  iload        // push variable 0 on the stack
 3:  iinc 0 1     // increment variable 0 by 1
 6:  istore_1     // store the top element of the stack to variable 1
 7:  bipush 100   // push 100 on the stack
--->9:  istore_2     // store the top element of the stack to variable 2
10:  iload_0      // push variable 0 on the stack
11:  iload_1      // push variable 1 on the stack
12:  iadd         // add the top two elements and push the result
13:  istore_2     // store the top element of the stack to variable 2
1:1
F1 Help  F7 Trace  F8 Step  -+ Edit  F9 Execute  F10 Menu
```

METHOD FOR RECONSTRUCTING DEBUGGING INFORMATION FOR A DECOMPILED EXECUTABLE FILE

CROSS-REFERENCES TO RELATED APPLICATIONS

This application claims priority from U.S. Provisional Application Ser. No. 60/060,480 filed Sep. 30, 1997 and that application is incorporated by reference herein for all purposes.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of program debuggers. More specifically, one embodiment of the invention provides for a method and apparatus for generating debugging information where source code is not available.

Program debugging is the process of analyzing a program in a test environment to uncover details about the program's operation. Those details can be used to correct errors in program operation or to understand more about the way a program operates. If source code is available for the program being debugged, the source code can be used in debugging. A typical source code debugger presents a user with a listing of the source code of the program being debugged and the debugger indicates the current line of source code. With a source code debugger, a user can "trace" through a program, i.e., execute one source code statement at a time, to see the line-by-line effects of the program. Typically, the effects include program output and changes to program variables. Many debugging systems include variable displays that display the current values of program variables. Using a variable display, the user can see the effects of the program on program variables as the user traces through a program being debugged.

Source code is a format of a program that is easily readable and edited by humans. Well-written source code is an unambiguous expression of the instructions making up a program, but source code is often not the most efficient way for a computer to process these instructions. Because of this, source code is often "compiled" into "executable" code by a compiler. With a good compiler, executable code is optimized for performance and/or memory usage. Executable code may be readable by humans, but it is usually not as easily understood as source code and it usually not editable except for very simple programs or very complex editing processes.

Another reason for compiling source code into executable code has to do with program distribution. Where an author of a program wants to distribute a program for execution by others, but does not want them to know about details of the program and/or does not want them to be editing the program, the author will compile the program's source code and only distribute the executable code output by the compiler.

When a recipient of the executable wants to understand the program's operation or wants to edit the program to create a modified version of the program, the recipient might be able to run a decompiler on the executable code to generate an approximation of the source code. A decompiler cannot typically regenerate the original source code exactly, as some information from the source code is not carried over to the executable code and the compiler may have some optimizations which lose information as the compiler makes the executable code more efficient. The lost information includes variable names and source to executable line correspondences. Variable names are lost when the source code includes descriptive variable names and the compiler replaces them with more concise variable references, such as consecutive numbers or pointers.

Variable references and source to executable line correspondences are not necessary to execute the program (only the executable code is necessary, by definition), but are useful when debugging the executable code. The line correspondences allow a debugging system to indicate, using highlighting or other well known methods, which line of source is being executed, i.e., which line of source corresponds to the executable instruction being executed. Variable references are used by the debugging system as labels to identify variables being watched.

Figure 1:
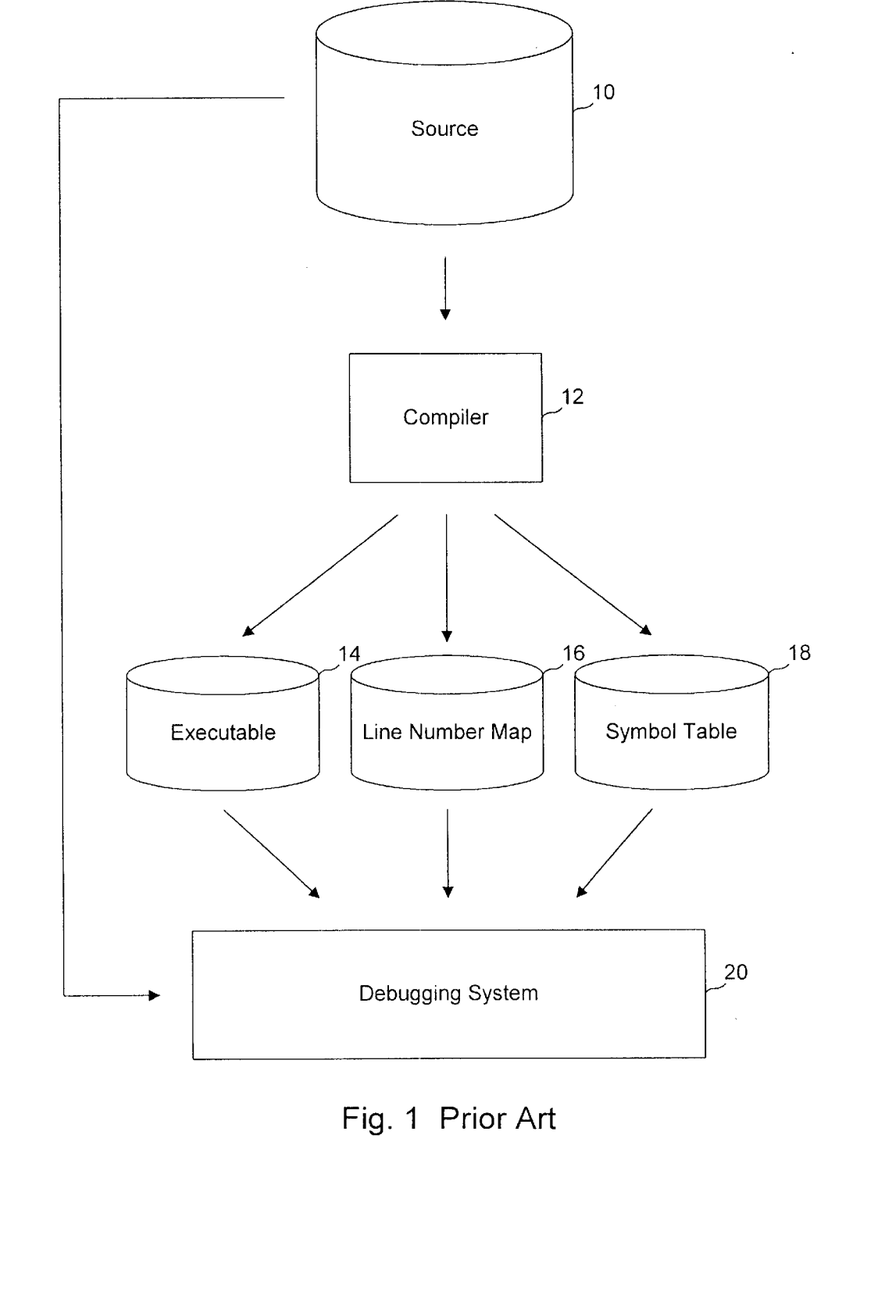
FIG. 1 is a block diagram of a system for debugging a program when source code is available.
Figure 2:
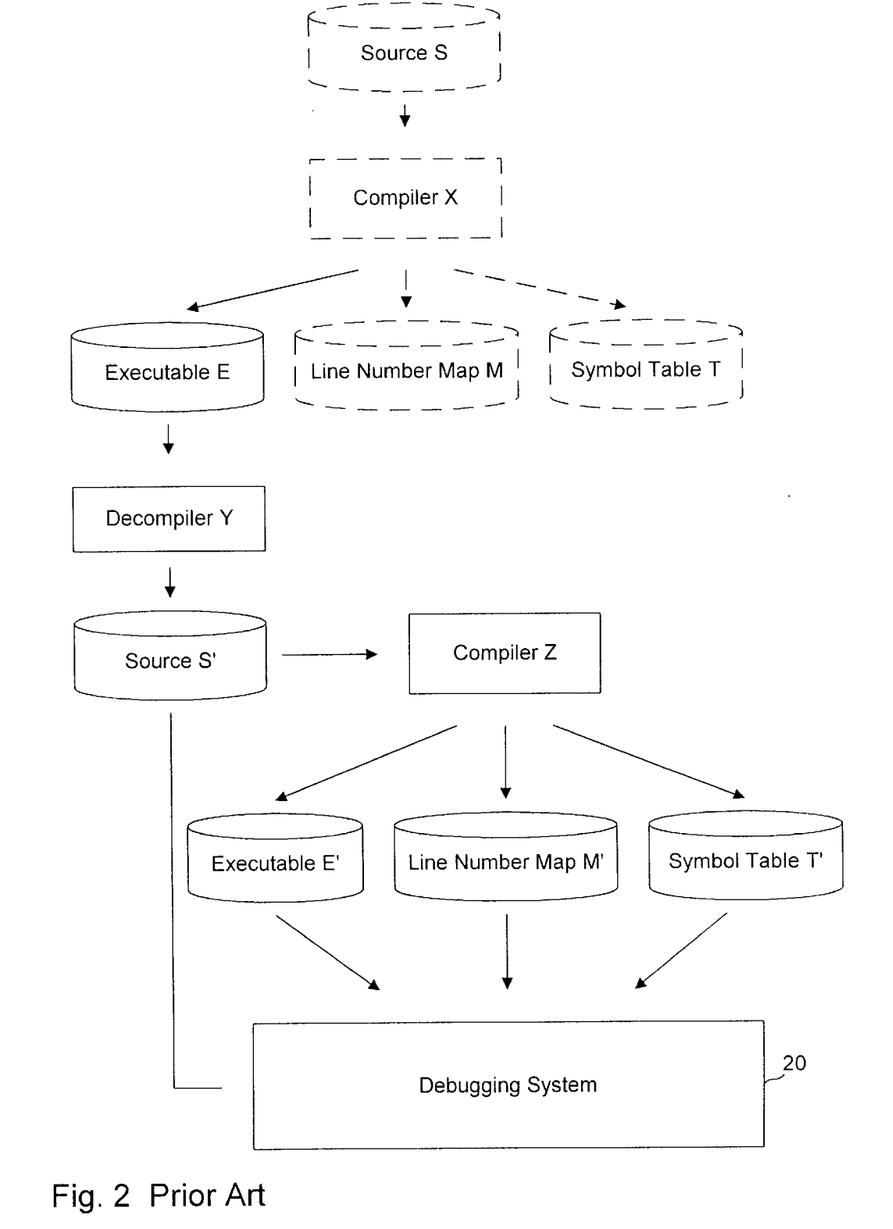
FIG. 2 is a block diagram of a system for debugging an approximation of a program when source code is not available.

FIGS. 1–2 illustrate two systems of debugging that have been used in the past. As shown in FIG. 1, a source code file 10 containing source code is passed to a compiler 12 which generates an executable code file 14, a line number map file 16 and a symbol table file 18 for the source code in file 10. Files 14, 16 and 18 are passed to a debugging system 20, which a user uses to debug the program represented by the source code and the executable code. As should be apparent, the scheme of FIG. 1 requires that line number map file 16 and symbol table file 18 be accessible by debugging system 20. As those two files are not needed for execution, they are generally not provided with the executable code provided to end users.

FIG. 2 shows a system that allows debugging without having access to the original line number map file and symbol table file. As shown there, a source file S is passed to a compiler X, which generates an executable file E, a line number map M and a symbol table T. Source file S, compiler X, line number map M and symbol table T are shown with dotted lines to indicate that they are not available to the operator of debugging system 20. To overcome the lack of these files, a decompiler Y is used to generate source file S' from executable file E. Source file S' is then passed to a compiler Z which generates executable file E', line number map M' and symbol table T'. Debugging system 20 then uses source file S', executable file E', line number map M' and symbol table T' in its debugging process.

In FIG. 2, similar elements are noted with primes (e.g., S, S') to point out where the similar items are not identical. Source S' is not identical to source S because some information is lost, but also because decompiler Y is not an exact inverse of compiler X. In addition to converting source code into executable code, a compiler will often rearrange instructions to optimize the program. For example, if a compiler encounters a loop with an instruction to set a variable to a constant value, the compiler might move that instruction to a point before the loop so that the value does not get set on every pass through the loop. When a decompiler then generates source code from that executable code, the instruction to set the variable will appear before the source code for the loop. It may be possible to design a decompiler to be the exact inverse of a compiler if the compiler does not perform irreversible optimizations, but in practice, the user of the debugging system does not even know which compiler the program distributor used for compiler X.

As an additional complication to the scheme shown in FIG. 2, debugging system 20 operates not on executable file E, but on executable file E', so the differences between the two executable files might cause bugs to disappear only during debugging or cause bugs to appear in executable file Et that were not in the original executable file E.

From the above it is seen that an improved method and apparatus for debugging executable code is needed.

SUMMARY OF THE INVENTION

An improved debugging method and apparatus is provided by virtue of the present invention. In one embodiment of a debugging system according to the present invention, a decompiler provides information to a table generator which generates a line number map and a symbol table, each of which corresponds to an executable file being decompiled. In a specific embodiment, the table generator operation is triggered by hooks into specific operations performed by the decompiler. In one aspect of the present invention, a debugging information program can be hooked into a decompiler to generate the debugging information and modify the source code output by the decompiler. For example, the program can be hooked into the decompiler to monitor when the decompiler inserts or deletes source statements, generates line numbers for source lines, or assigns variable names to variables encountered in the executable code.

A further understanding of the nature and advantages of the inventions herein may be realized by reference to the remaining portions of the specification and the attached drawings.

DESCRIPTION OF THE PREFERRED EMBODIMENTS

The present invention finds many applications. One useful application is the debugging of programs where only executable code is provided. One particularly useful instance of this is debugging executable code in the JAVA™ language. The JAVA™ language was developed by Sun Microsystems, Inc., of Mountain View, Calif. Typically, a JAVA™ developer writes a program and compiles it into a "class file" containing "byte-codes" representing instructions. The class file can then be distributed to users, or it can be placed on a Web site, i.e., a document server coupled to the global Internet for serving documents ("web pages") using HTTP (HyperText Transport Protocol). A "Web site" is so named because the many hypertext documents on various HTTP servers include links to other hypertext documents and together they form a web of documents. A user at a client machine typically uses a program called a "browser" to browse the web, i.e., follow links of documents through the web. The particular web can be an internal web (on an "intranet") or can be the global "World Wide Web" (or "WWW").

As Web sites evolved, they began to serve more than just static documents. Using various interface methods, some requests for a document would trigger a document server to generate a document, or part of a document, on the fly and send the dynamically created document back as a response to the request. Thus, a request for a document would trigger computation at the server and the result of the computation would be returned as a document in response to the request.

For various reasons, it may be preferred that the computations occur at the requestor's computer rather than at the document server. One way to do this is with a link pointing to a JAVA™ class file. When a browser selects such a link, it typically downloads a class file containing executable code and executes that code. For class files to execute on a client computer, they need to be accessible to users. Consequently, a user can save and manipulate the class file (actually, the user's copy of the class file). Since the source is not needed for execution, it is generally not provided.

Because of the wide availability and use of the JAVA™ language and the fact that the form of JAVA™ executable files are more versatile than other forms of executables, JAVA™ class files are very amenable to debugging using the present invention. However, it should be understood that the present invention is not limited to a particular type of executable or a particular source language.

The present invention is also not limited to the applications described herein. One such application is to debug errors where source code is not available. Another application is to debug or understand programs where source code is available, but a developer is interested in identifying what changes a particular compiler might make to a program as it generates executable code.

One example of a debugging system according to the present invention as it applies to one example section of source code is presented in FIGS. 3–9. It should be understood that the example shown is extremely simple (and does not necessarily do anything useful) so that the example and the interrelationships of the elements are clear. In practice, an actual source program would be much longer and more complex.

Figure 3:
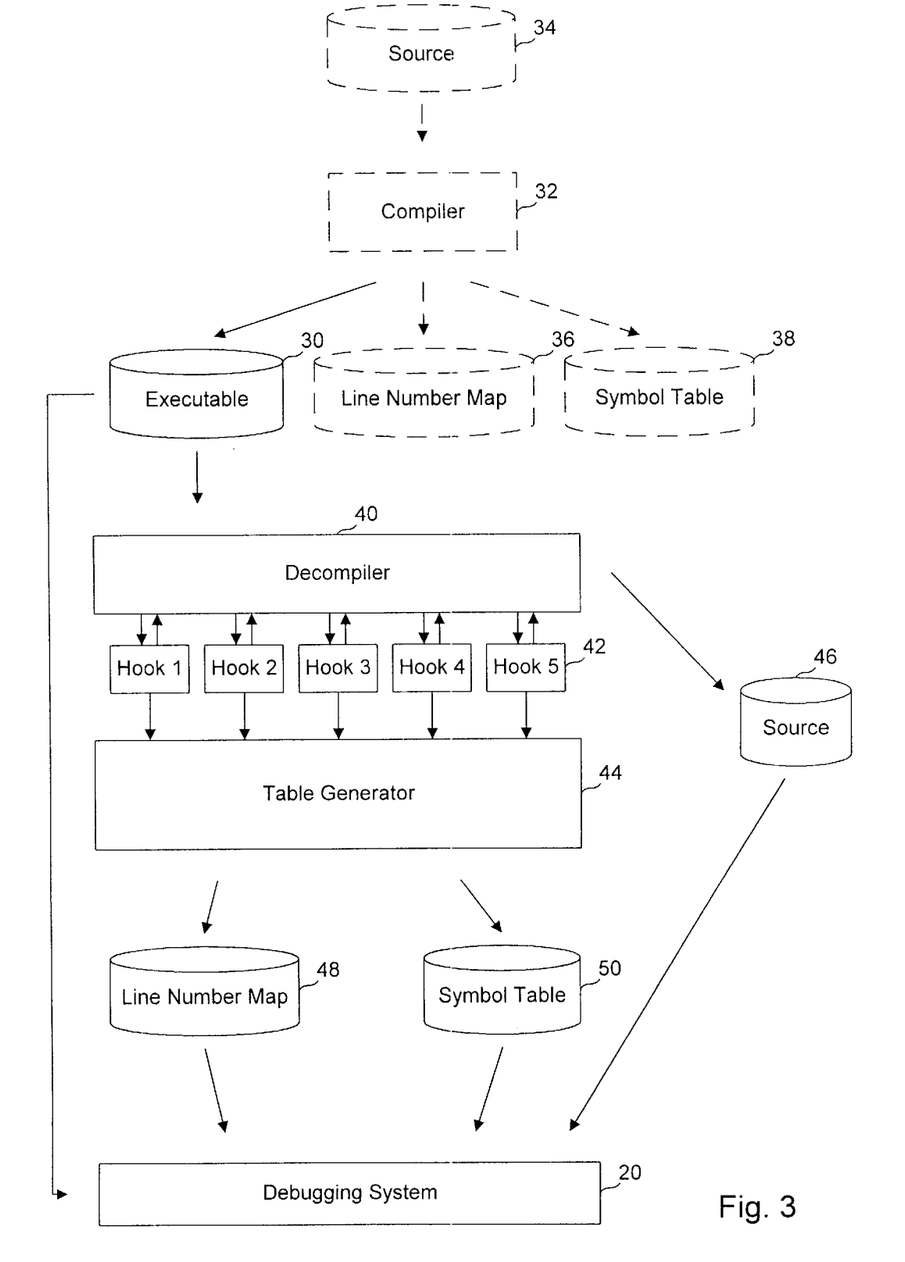
FIG. 3 is a block diagram of a debugging system according to one embodiment of the present invention for debugging a program using the executable code of the program provided.

Referring now to FIG. 3, a debugging system 20 and an apparatus for generating its inputs is there shown. An executable file 30 is provided to debugging system 20. In this example, executable file 30 is an output of a compiler 32 which generated, from a source code file 34, executable file 30 as well as a line number map 36 and a symbol table 38. In this example, it is also assumed that source code file 34, line number map 36 and symbol table 38 are not available to debugging system 20.

A decompiler 40 includes hooks 42 for a table generator 44. Decompiler 40 outputs a decompiled source file 46 from executable file 30 and table generator 44 generates a line number map 48 and symbol table 50 from triggers on hooks 42. In an alternate embodiment, table generator 44 is integrated into decompiler 40. However, where the use of a particular decompiler that does not have a table generator is desired, all that is needed is for the decompiler to have hooks into its operation.

A decompiler will usually have the capability to perform the following functions:

1. Output a basic statement—a basic statement is a single line of source code.

2. Delete a previously generated basic statement.

3. Insert a new basic statement between two previously generated basic statements.

4. Generate nonstatement lines (e.g., blank lines for formatting source code files, method headers and footers, variable initializers).

5. Choose a name for a variable.

If decompiler 40 provides a hook for table processing when decompiler 40 performs each of these steps, table generator 44 can generate its output correctly. These hooks are referred to herein as hook 1 through hook 5 and the operation of table generator 44 will now be described in further detail with reference to each of these hooks.

Hook 1 (basic statement generation): When decompiler 40 generates a basic statement, it knows the value of a program counter (i.e., the counter pointing to the current source code line) at which that basic statement began. Using hook 1, table generator 44 captures this program counter value, as well as a unique number used as a line number for the newly generated basic statement. This information is used to generate entries in line number map 48. This process assumes that the decompiler generates lines in a well-ordered way.

Hook 2 (basic statement deletion): If decompiler 40 needs to delete basic statements, table generator 44 will update line number map 48 to account for the deletion. If the statements will move in a well-defined way, all the line numbers in the mappings for statements following the deletion point can just be decremented by the number of lines deleted.

Hook 3 (basic statement insertion): If decompiler 40 needs to insert basic statements, table generator 44 will update line number map 48 to account for the insertion. When a statement is inserted, all statements following it move down. To account for this, table generator 44 increments all the line numbers in line number map 48 for statements following the insertion point. Generally, decompiler 40 will have no reason to delete or insert nonbasic statements.

Hook 4 (nonstatement line generation): When decompiler 40 generates a nonstatement line of source text, table generator simply updates the unique number counter so that line number map 48 will map executable code instructions to source listing line numbers, not just basic statement numbers.

Hook 5 (variable name choice): If decompiler 40 chooses a name for a variable, table generator 44 will add that information to symbol table 50. Table generator 44 also tracks when particular variable indices are reused, since there is no problem with a compiler using a variable, say variable A, to represent two different things in two different points in the same program. Symbol table 50 is augmented with ranges of program counters for which the given name is valid. Reuse is detected when decompiler 40 chooses a new name for a variable index that table generator 44 has already considered.

In the specific case of a JAVA™ class file (or method), a new class file is generated containing the information of line number map 48 and symbol table 50. Debugging information in a JAVA™ class file appears in well-defined locations within the file, as specified by the JAVA™ Virtual Machine specifications.

The class file is created by updating the method header for each method in the class file to indicate the presence of newly created debugging tables. The new method header is written to an output file (the new class file) according to the Java Virtual Machine specification. Following the method header is the rest of the data and executable code associated with this method from the executable file. Line number map 48 and symbol table 50 are formatted into debugging tables according to the JAVA™ Virtual Machine specifications and output as part of the new class file.

Using the above-described system, a programmer can easily debug a class file, or other program, without having to worry about a recompilation introducing new bugs.

Figure 4:
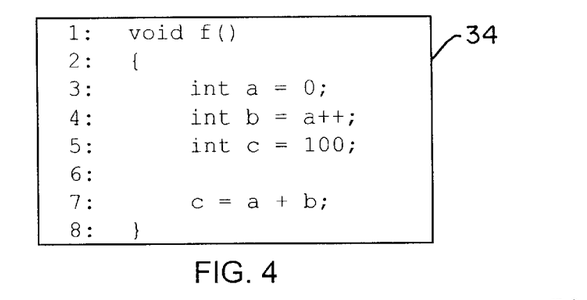
FIG. 4 is a listing of a source file.
Figure 5:
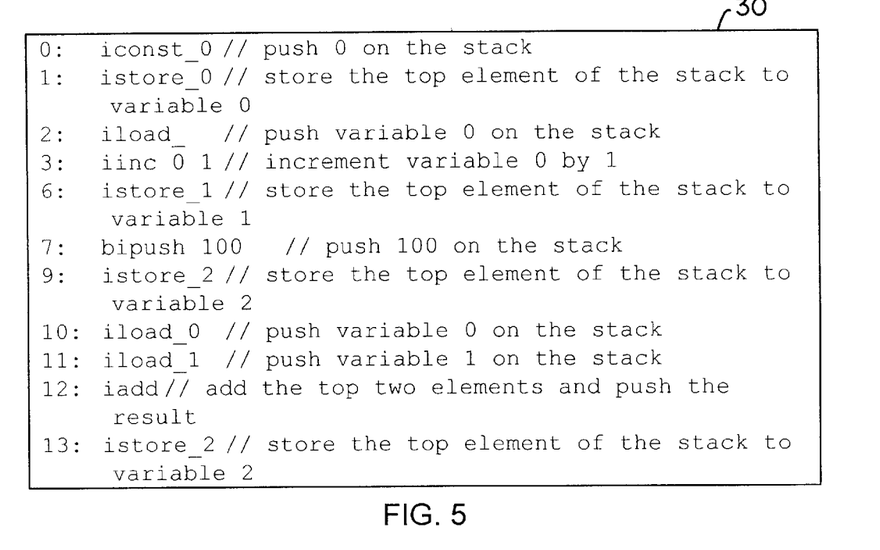
FIG. 5 is a listing of a commented executable file corresponding to the source file listed in FIG. 4.

FIGS. 4–9 illustrate a specific example of how the system shown in FIG. 3 might be used. FIG. 4 is a listing of source code file 34 from FIG. 3. FIG. 5 is a listing of executable code file 30 from FIG. 3. In practice, the comments included in that listing are not necessarily present in executable code file 30.

Figure 6:
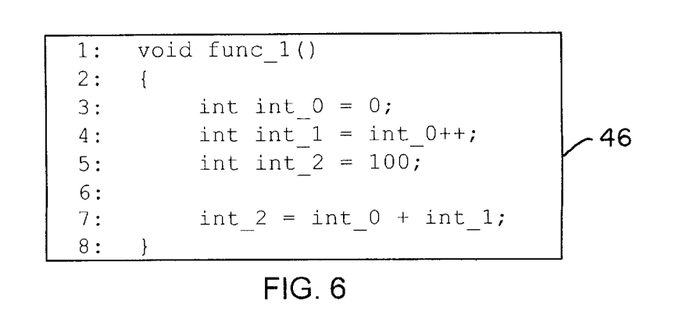
FIG. 6 is a listing of a decompiled source file resulting from decompilation of the executable file listed in FIG. 5.

FIG. 6 is a listing of source file 46. Note that source file 46 would perform the same actions as source file 34, but is slightly different. For one, the variable names are not preserved. Of course, if executable code file 30 were in a form that included variable names, the variable names from source file 34 could appear in source file 46. While source file 34 (FIG. 4) and source file 46 (FIG. 6) use the same formatting (e.g., indentation, placement of braces, use of newlines), this need not always be the case.

Figure 7:
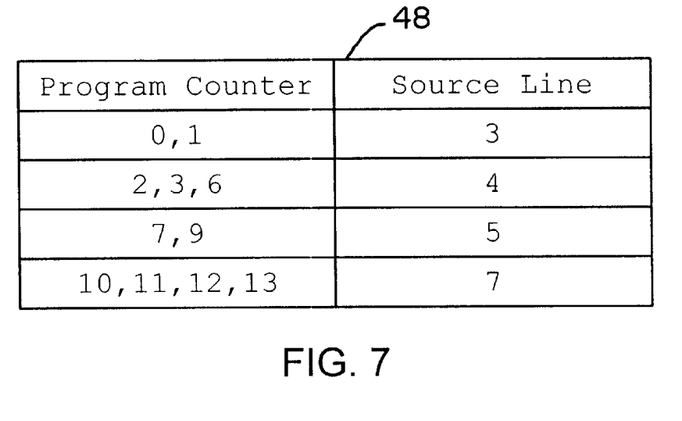
FIG. 7 is a table representing a line number map corresponding to the executable file listed in FIG. 5.
Figure 8:
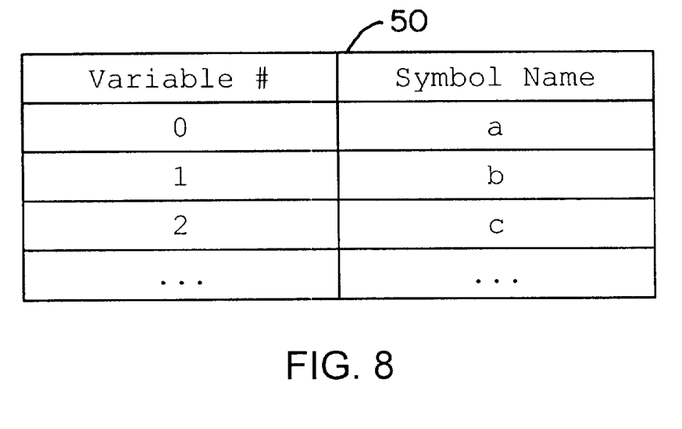
FIG. 8 is a table representing a symbol table corresponding to the executable file listed in FIG. 5.

FIG. 7 is a listing of line number map 48 and FIG. 8 is a listing of symbol table 50 that result from executable code file 30 (FIG. 5). Although symbol table 50 is shown containing only variables, other data elements, such as constants, pointers and other data elements might also be represented in symbol table 50.

Figure 9:
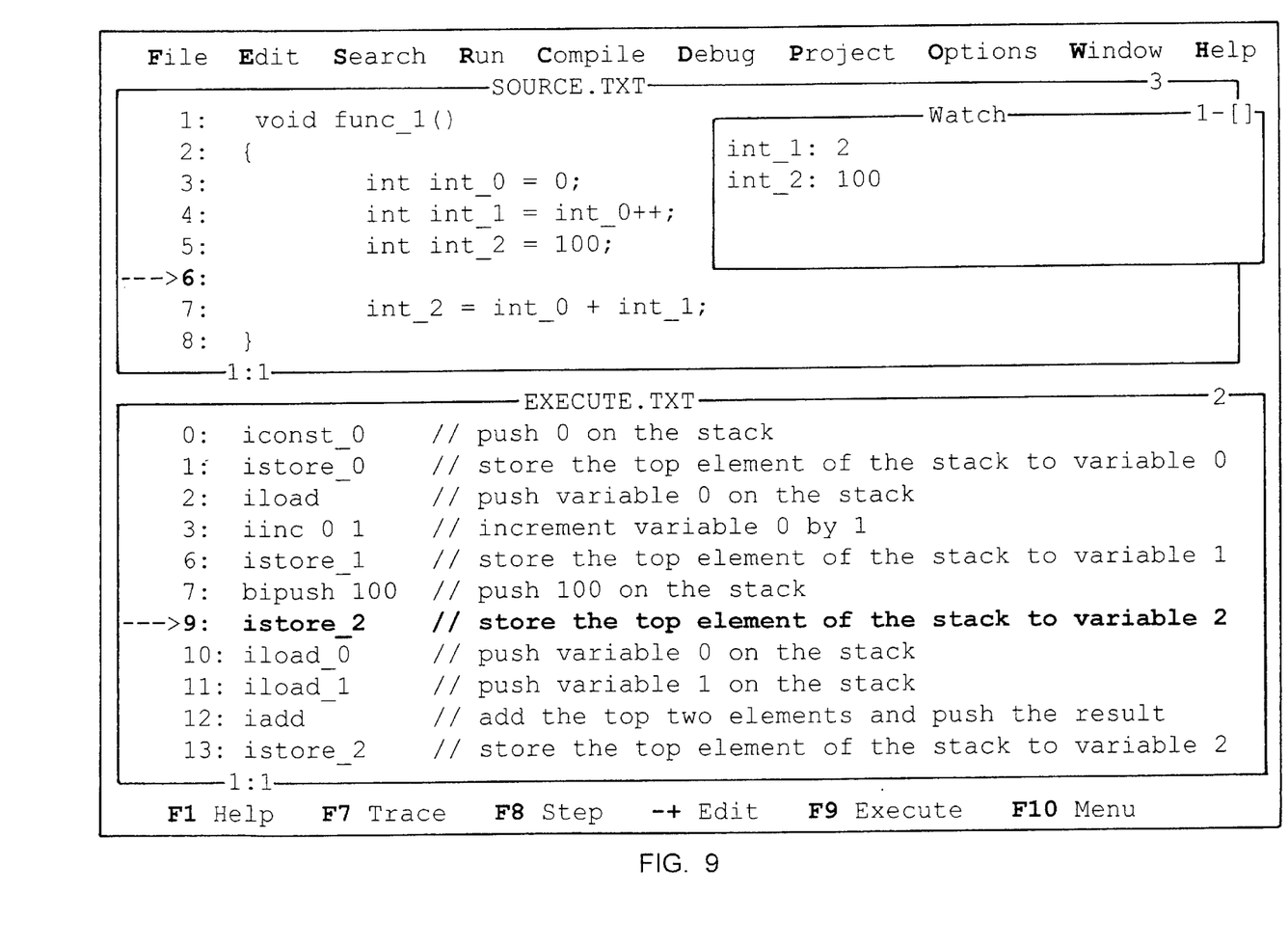
FIG. 9 is a screen shot of a debugging program in a process of debugging the executable file listed in FIG. 5.

FIG. 9 shows a debugging system screen where executable file 30 is being debugged. Note that a current source line and a current executed code line are highlighted. The current executed code line is tracked by the debugger, while the current source code line is determined from line number map 48. The relationship between executable code variables and source variables is provided by symbol table 50. The debugging system uses that information to generate the variable names in the "watch" window.

Figure 10:
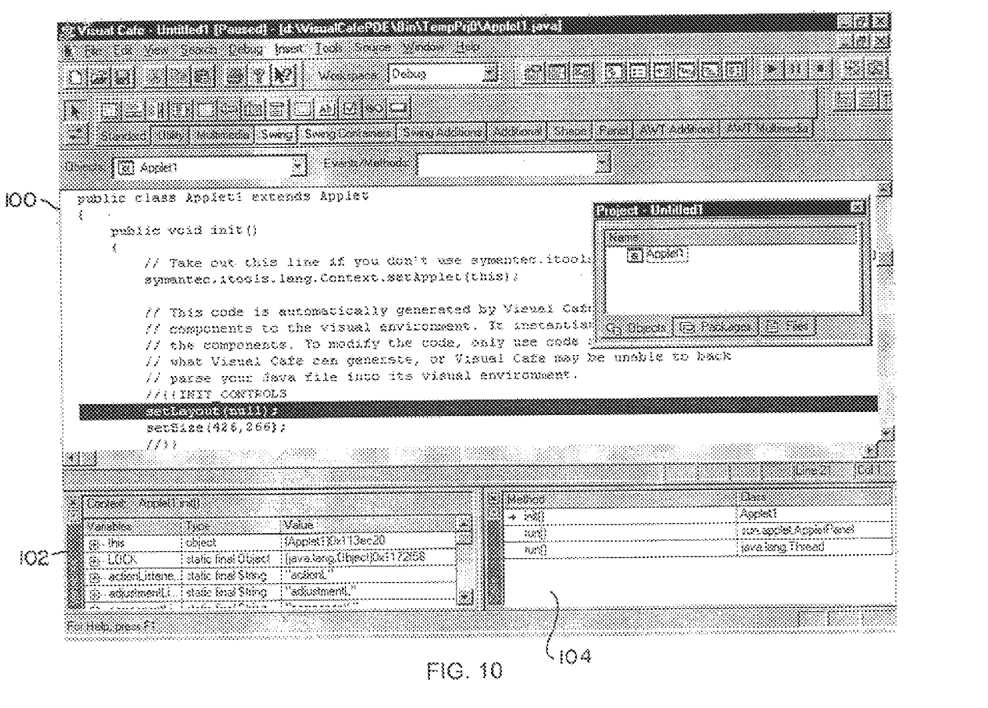
FIG. 10 is a screen shot of a different debugging program in a process of debugging a source file which calls code for which source code is not available.
Figure 11:
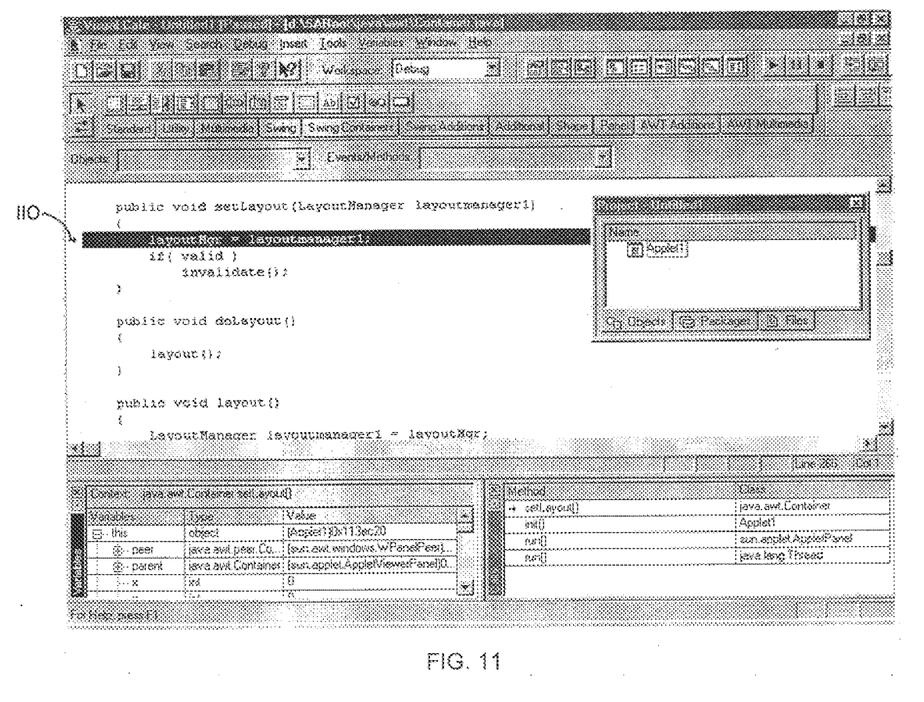
FIG. 11 is a screen shot of the debugging program shown in FIG. 10, where the source has been regenerated for the called code, including debugging information.

Another example of the use of the present invention in connection with a code debugging program is shown in FIGS. 10–11. FIG. 10 is a screen shot of a code debugging program. In this example, the code debugging program is the Visual Cafe™ environment provided by Symantec Corporation of Cupertino, Calif., for debugging JAVA™ class files, however other environments and languages might be used. In FIG. 10, the source code for a class file named "applet" is displayed in a main window 100. The screen display also includes a window 102 for variable display and a window 104 for method display.

A debugging cursor 110 indicates where a debugging process is in the code. Although it is not apparent from FIG. 10, it is assumed that the source code for the function "setLayout" is not otherwise available. Without the source code available, the typical response of a debugger might be to display the assembly code of "setLayout" function in main window 100 and allow the user to step through the assembly code. As should be apparent comparing the source listing of FIG. 4 or FIG. 6 to the executable listing of FIG. 5, debugging at the assembly code level is less than optimal in most cases.

With the debugging information described above, the source for the function could be displayed, as shown in FIG. 11. Note that in FIG. 11, debugging cursor 110 is now on the first source statement of the regenerated source code for the "setlayout" function. In the preferred embodiment of a debugging environment, the decompilation and debugging information generation occur transparently to the user, as if the debugging environment had source code available.

In summary, a debugging information generator has now been described. The debugging information generator could be an attachment to an existing decompiler or could be integrated with a source code generator into a decompiler. The debugging information includes information mapping executable line numbers to source line numbers and information mapping data elements in the executable code, such as variables, to data elements in the source code generated by the decompiler. Where the debugging information generator is an attachment separated from the decompiler, the debugging information generator could operate from a set of hooks into the decompiler. Such hooks might be implemented by having a decompiler that calls external functions when hooking events occur. One set of hooks includes a source statement generation hook, a source statement deletion hook, a source statement insertion hook, a nonstatement line generation hook and a variable assignment hook. With the nonstatement line generation hook, the line number map could include the correspondence between the lines of the source listing to the executable, even if the source listing includes nonstatement lines, such as comments and blank lines added for readability.

The above description is illustrative and not restrictive. Many variations of the invention will become apparent to those of skill in the art upon review of this disclosure. For example, the debugging process was described using one executable file and one source file, however, the executable code might comprise one or more file and the source code might comprise one or more file. Furthermore, the executable file might include native instructions, such as machine code or assembly code, or intermediate instructions, which are readily converted to native instructions. The scope of the invention should, therefore, be determined not with reference to the above description, but instead should be determined with reference to the appended claims along with their full scope of equivalents.

What is claimed is:

1. A decompiler for decompiling target executable code into target source code with debugging information, wherein executable code comprises a plurality of instructions for a particular computing environment and source code comprises a plurality of instructions in a form readable by programmers, and wherein the target executable code is a result of compiling initial source code, the decompiler comprising:

source generation means for generating one or more source statements of the target source code from one or more instructions of the target executable code, wherein the one or more source statements are such that a compiler for the particular computing environment would compile the one or more source statements into the one or more instructions of the target executable code, or functionally equivalent instructions which are functionally equivalent to the one or more instructions of the target executable code, wherein the source generation means includes hooks for incorporating additional functionality at a plurality of hook points in the source generation means; and means for generating debugging information independent of the initial source code, the debugging information being information about source code that would correspond to the target executable code, wherein the means for generating debugging information comprises additional functionality hooked at the plurality of hook points to generate the debugging information in response to the decompiler processing through each of the plurality of hook pints.

2. The decompiler of claim 1, wherein the debugging information includes a line number map, which maps line numbers between the target executable code and the target source code, and a symbol table, which maps source data element names to executable data elements.

3. The decompiler of claim 1, wherein the plurality of hook points include at least:

a first hook that is executed when the source generation means generates one or more source statements of the target source code from one or more instructions of the target executable code;

a second hook that is executed when the source generation means deletes a source statement of the target source code; and a third hook that is executed when the source generation means inserts a source statement of the target source code.

4. The decompiler of claim 3, wherein the plurality of hook points further comprise:

a fourth hook that is executed when the source generation means generates a nonstatement line of source text in the target source code; and a fifth hook that is executed when the source generation means assigns a source data element name to data element encountered in the target executable code.

5. The decompiler of claim 4, wherein the additional functionality added at the fourth hook includes logic to add line numbering for nonstatement lines where indicated by a readability format.

6. The decompiler of claim 1, further comprising means for organizing the target source code and the debugging information into a class file in a format expected by a class file debugger.

7. The decompiler of claim 1, wherein the target executable code comprises one or more executable code files and the target source code comprises one or more source code files.

8. The decompiler of claim 1, wherein the target executable code comprises instructions that are native instructions for a particular computing environment.

9. The decompiler of claim 1, wherein the target executable code comprises a plurality of instructions which are in an intermediate form readily convertible into native instructions for a particular computing environment.

10. The decompiler of claim 1, wherein the target source code includes comments.

* * * * *